United States Patent [19]
Zarembka

[11] 3,927,740
[45] Dec. 23, 1975

[54] BRAKE DISK WITH TAPERED KEY WAY

[75] Inventor: Robert L. Zarembka, Akron, Ohio

[73] Assignee: Goodyear Aerospace Corporation, Akron, Ohio

[22] Filed: July 1, 1974

[21] Appl. No.: 484,411

[52] U.S. Cl. ...... 188/218 XL; 192/70.2; 192/107 R
[51] Int. Cl.² ......................................... F16D 65/12
[58] Field of Search .................... 188/73.2, 218 XL; 192/70.19, 70.2, 107 R; 403/359

[56] References Cited
UNITED STATES PATENTS

| | | | |
|---|---|---|---|
| 2,542,545 | 2/1951 | Lyman................................ | 188/73.2 |
| 3,650,357 | 3/1972 | Nelson et al.................... | 188/73.2 X |
| 3,692,150 | 9/1972 | Ruppe, Jr. ..................... | 188/73.2 X |
| 3,757,907 | 9/1973 | Crossman et al.................. | 188/73.2 |

Primary Examiner—George E. A. Halvosa
Attorney, Agent, or Firm—F. W. Brunner; P. E. Milliken; E. W. Oldham

[57] ABSTRACT

Disclosed is a brake disk and associated reinforcement clip wherein the brake disk contains a plurality of trapezoidal key slots spaced about a peripheral edge thereof for making engagement with a similar plurality of trapezoidal keys. Metallic reinforcement clips having trapezoidal key slots therein are utilized for reinforcing the key slots of the brake disk when the disk is composed of carbon or other material of low force resistance. The clip includes caps interconnecting the sides thereof along the entire length of the clip but for the key slot area so as to substantially encapsulate the peripheral edge of the disk.

1 Claim, 7 Drawing Figures

BRAKE DISK WITH TAPERED KEY WAY

BACKGROUND OF THE INVENTION

For many years in the art of aircraft braking systems, it has been known to provide a brake disk stack comprising a plurality of brake disks alternately splined to the wheel and axle of the aircraft; the braking of the aircraft being achieved by the forceful frictional engagement of various brake disks with each other. Early in the art, such brake disks were of a steel construction readily able to withstand the shearing and compressive forces exerted thereon between the key and key slots when the braking action took place. However, with the advancement of the art toward the utilization of carbon brake disks and disks of other materials having less strength than steel, the keying of these disks to the respective elements has become a more difficult matter due to the lesser resistance of the carbon composition to the compressive and shearing forces.

In the more recent art, as shown in FIG. 1, the carbon composition disks have been reinforced by the addition of a steel clip 10 affixed by means of rivets 12 to the carbon brake disk 14. The clip 10 is characterized by the presence of a rectangular key way or slot 16 therein; this slot making engagement with a rectangular key (not shown) affixed to the appropriate aircraft wheel. The key slot 16 is received within a recess 18 formed by the removal of a semicircular section of the periphery of the carbon disk 14. As can be noted, the key slot 16 is totally received within the recess 18 and at no point makes contact with the carbon composition. Consequently, under a braking condition the forces imparted to the clip 10 from the key retained within the key slot 16 are borne by the rivets 12 and not directly upon a face of the carbon composition.

Several problems have become apparent with the prior art teachings. The clips 10 have often had a tendency to buckle and crack at the points 20, comprising the narrowest points on the clip. This problem is apparently due to a combination of thermal expansion and contraction and force impartation during the braking action. It is noted that the entire force cast upon the clip 10 by the key must be passed along the clip 10 to the rivets 12 since no portion of key slot 16 makes contact with the carbon composition of the disk 14. Quite apparently, the clip 10 will fail, if at all, at its weakest points 20.

It is also been noted that the intensive heat imparted to the carbon brake disk 14 and the exposure of the disk to the atmosphere results in an oxidation or shrinkage of the disk material and a consequent loosening of the clip 10 and rivets 12 therefrom.

Consequently, it is an object of the instant invention to present a key slot in a carbon brake alleviating the prior art drawbacks mentioned hereinabove.

Yet another object of the invention is to present a combination of a carbon brake disk and key slot clip wherein the key makes contact with the carbon composition material providing a greater area for relief than heretofore known.

Yet another object of the invention is to present a combination of a carbon brake disk and key slot clip wherein the clip substantially covers the associated portion of the periphery of the disk so as to seal the disk periphery and slots from the atmosphere and thus prevent oxidation.

These objects and other objects which will become apparent as the description proceeds are achieved by apparatus for braking a moving vehicle, comprising at least one annular brake disk having a plurality of evenly spaced slots formed about one periphery thereof, the slots, in the plane of the disk, having a bottom edge and two sides oblique thereto; and a plurality of reinforcement clips fixedly secured to said disk at said slots, the clips having slots therein congruent with the slots of the disk and aligned therewith.

For a thorough understanding of the preferred embodiment of the invention and the objects and techniques thereof, reference should be had to the following detailed description and accompanying drawings wherein.

Figure 4A:
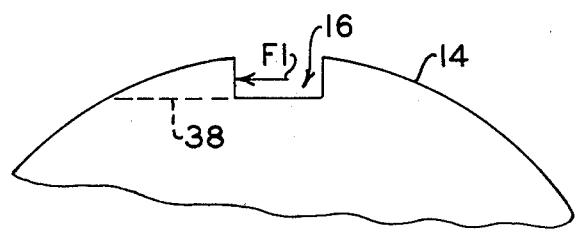
Figure 4B:
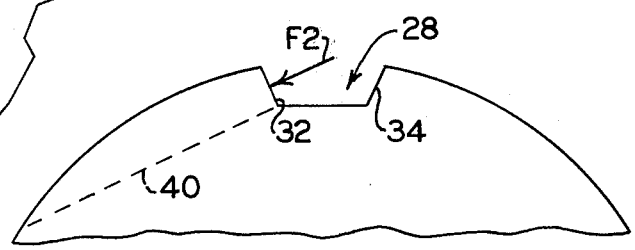
Figure 5:
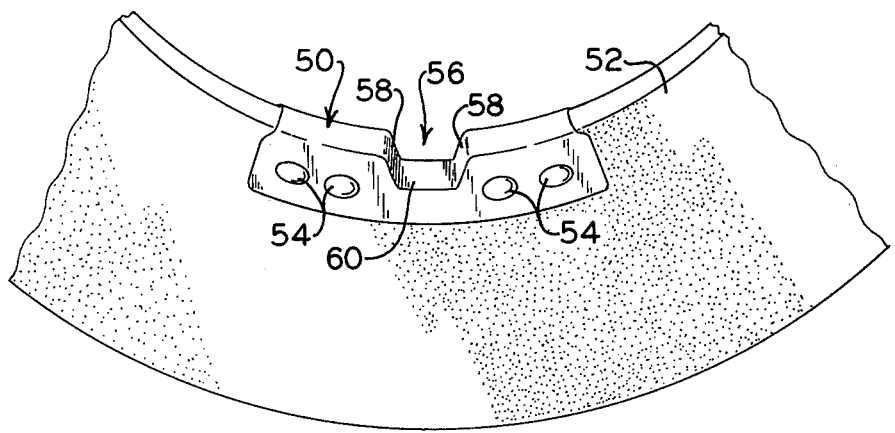

FIG. 4, comprised of FIGS. 4A and 4B, is a perspective comparison of the shearing force restraint characteristics of the prior art compared with those of the disclosed invention; and FIG. 5 is a partial perspective illustration of a brake disk utilizing a key slot clip about the inner periphery thereof and being of such nature as to have a totally metallic engagement with the key.

Figure 2:
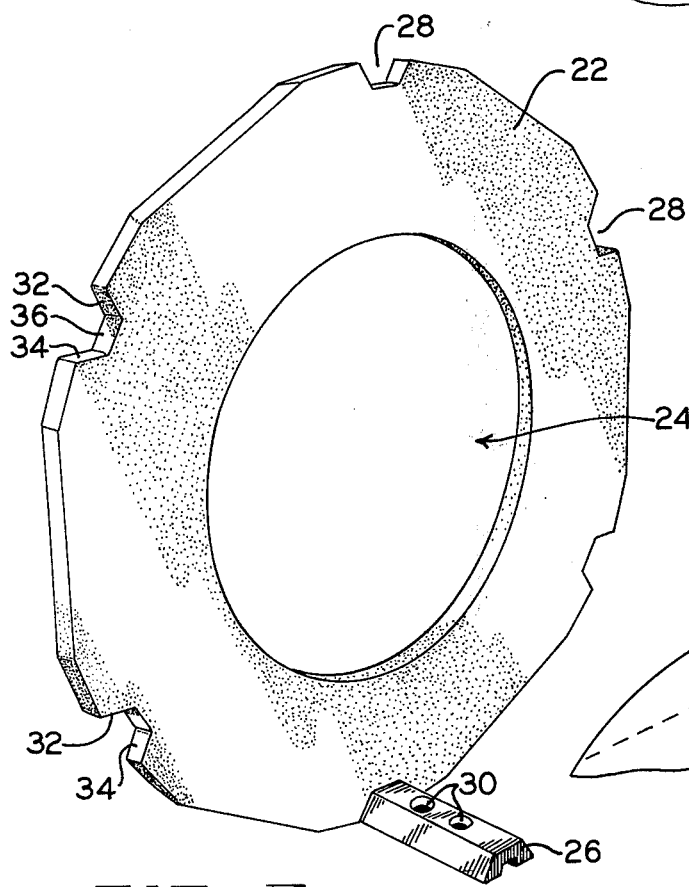
FIG. 2 is a perspective illustration of a brake disk in engagement with a key in accordance with the teachings of the invention.

Referring now to the drawings and more particularly FIG. 2, a carbon brake disk 22 constructed in accordance with the teachings of the invention may be seen. The disk 22 has an annular opening 24 in the center thereof to allow rotation of the disk 22 about the axle of the associated wheel. A trapezoidal key 26 is shown in engagement with one of a plurality of key slots 28 positioned in spaced relationship about the periphery of the disk 22. Holes 30 are presented along the key 26 to provide means for fixedly securing the key to the wheel of the associated aircraft. It should of course be understood that there is provided about the wheel of the aircraft a number of keys 26 equivalent to the number of key slots 28 present on the disk 22. The keys 26 are, of course, positioned in the proper parallel circumferentially spaced relationship with each other such that the customary engagement and disengagement of the brake disk stack may be provided with the disks moving laterally along the keys. Since the elements of the brake disk stack must be capable of relative axial movement along the axle of the aircraft, it is contemplated that the keys 26 and key slots 28 engage in a reasonably loose manner to allow such movement. It should, of course, be understood that alternate disks are similarly keyed to the wheel axle.

It can be noted that the key slots 28 of the disk 22 are themselves of a trapezoidal nature in that the sides 32, 34 are oblique to the bottom 36 thereof. It should be readily apparent that for a key slot of any given depth, the tapered sides 32, 34 provide a larger area for contact with the key 26 than would a similar rectangular key and key slot as provided in the prior art. Consequently, there is provided a larger surface area for receiving, absorbing, and transmitting the forces imparted thereon during a braking action.

Not only is the actual surface area in contact with the key increased by the trapezoidal key and key slot design of the invention, but the line of resistance to the imparted forces is significantly altered as is shown in FIG. 4. The prior art teaching of FIG. 4A shows that the application of a force F1 to a side of a key slot 16 will most likely cause a crumbling or shear effect in the carbon composition along a line 38 which is substantially parallel to the force F1. The amount of carbon material available for receiving and resisting this crumbling effect is of course dependent upon the depth of the key slot 16 and the radius of the disk 14. A particular advantage associated with the utilization of the trapezoidal key and key slots of the instant invention should be readily apparent by the comparison of FIGS. 4A and 4B. In the latter figure, a force F2 is again perpendicularly incident to a face 32 of the tapered key slot 28. The normal line of fracture or crumbling is again parallel to the direction of the force F2. In this situation, however, due to the tapering of the side 32, the line of fracture 40 is of substantially greater length than that existing in the prior art of FIG. 4A. The brake disk of FIG. 4B, being constructed according to the teachings of the instant invention, is consequently capable of withstanding greater forces without crumbling than is the prior art brake disk. In other words, the instant invention provides a larger mass of the carbon composition of the brake disk for absorbing the compressive forces imparted thereto between the key and the key slot during a braking operation.

As mentioned above, the line of fracture of the brake disk is dependent upon the degree of taper of the sides 32,34 of the slot 28. Similarly, the area of carbon available for immediate contact with the key is similarly dependent upon the angle of taper. While any of numerous angles have been found to be suitable for achieving the objects of the invention, it is preferred that the sides 32,34 deviate from the perpendicular with respect to the bottom 36 approximately 10° to 30°. In order to prevent the riding-up of the slot 28 on the key 26, and a consequent locking thereof, it is contemplated that the tapering of the sides 32,34 not exceed 45°.

Since most carbon compositions presently available for brake disks are not capable of withstanding, by themselves, the above-discussed forces, it is contemplated that clips will be utilized for reinforcing the carbon material. It is however presented that, with the advent of stronger carbon materials, the brake disk of the instant invention as shown in FIG. 2 could readily be utilized without any strengthening clips. However, with the commonly utilized carbon composition material, it is contemplated that clips 40 as shown in FIG. 3 will be utilized.

Figure 1:
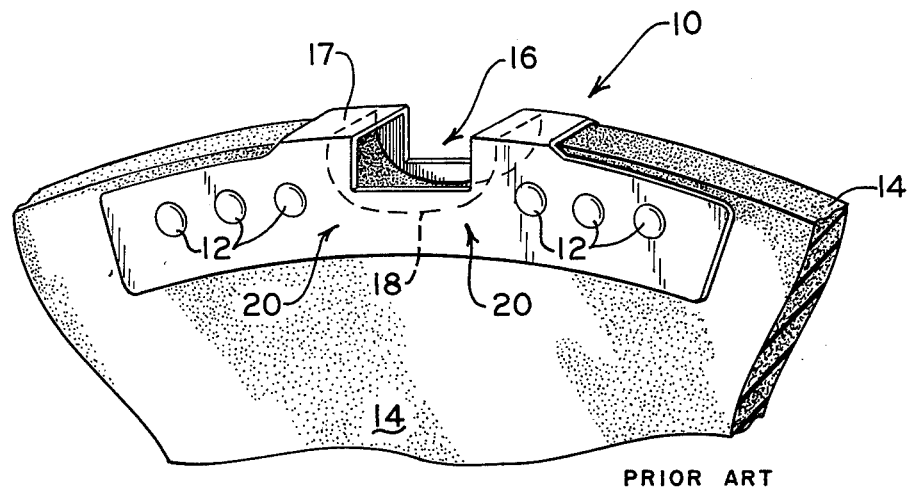
FIG. 1 is a perspective showing of the prior art.

The prior art steel clip 10 of FIG. 1 is shown as having caps 17 extending a slight distance on either side of the slot 16 along the edge of the carbon disk 14. As can be clearly noted from FIG. 1, the prior art caps 17 are generally extended to a point somewhere between the edge of the slot 16 and the rivets 12. It has been found that an oxidation or other type of diminution of the carbon composition material is often experienced by the combination of the heat imparted thereto and the exposure of the material to the atmosphere. Such diminution of material results in a loosening of the clip engagement with the disk since the shrinkage of the carbon composition material is not accompanied by a similar shrinkage of the clip 10 or rivets 12. It has therefore been proposed as a further structural characteristic of the invention that the clip 40 as shown in FIG. 3 will have an extended cap 44 extending from the edges of the key slot 46 to a point closely aligned with the positioning of the furthest rivet 42 from the sides of the slot. Consequently, the edge of the brake disk 48 will be encapsulated and impervious to the affects of the atmosphere thereon. It has been found that such a clip results in a more secure engagement of the clip with the disk and the normally occuring diminution of material at the clip position is greatly lessened.

Further, it has been found that distortion of the clip itself is greatly reduced by the structure of the invention since a more uniform transfer of heat between the clip and disk is realized due to the fact that the clip and disk are in total contact along the entire clip length.

Figure 3:
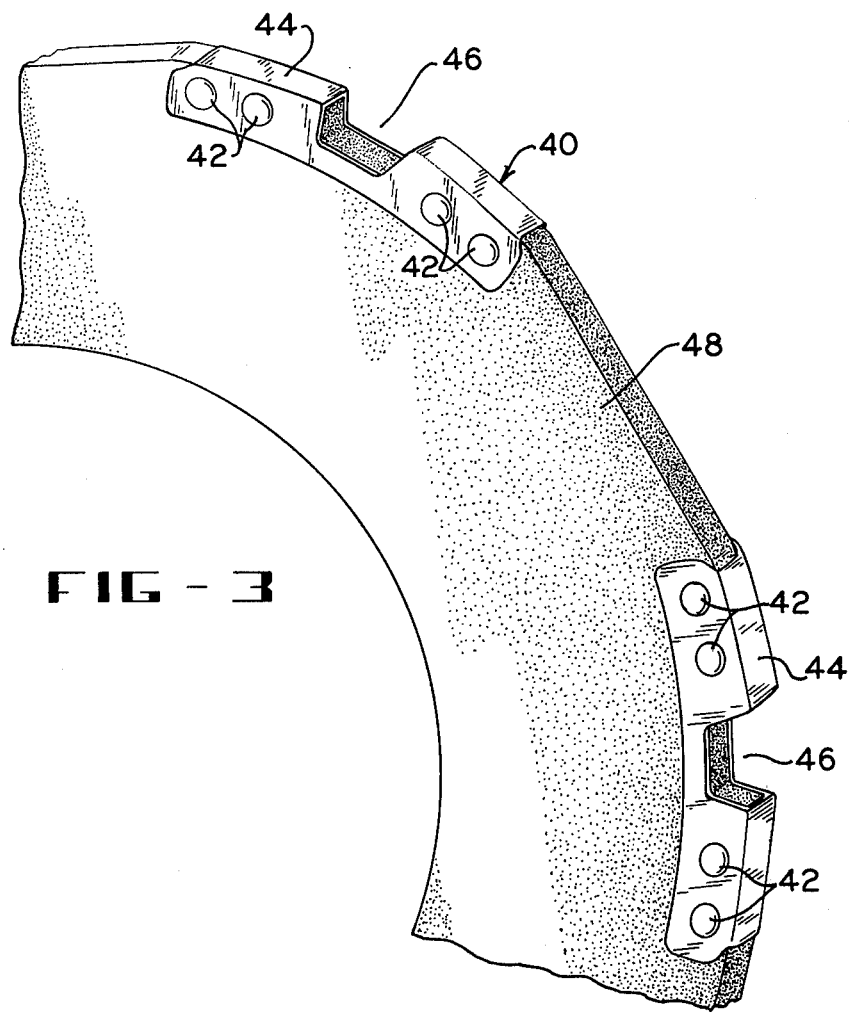
FIG. 3 is a partial perspective view of a brake disk utilizing key slot clips designed in accordance with the teachings of the invention.

As can further be seen from FIG. 3, the proposed clip of the invention has a key slot therein which itself is trapezoidal in nature, having edges thereof which are respectively angled in the same degree as are the sides of the key slot within the disk with which the clip is to be used. In other words, to utilize a clip as shown in FIG. 3 with a disk of FIG. 2 it would be understood that the clip key slot edges would be flush with the sides 32,34 and the bottom 36 of the key slot 28. Thus forces imparted by the key upon the slot would be restrained by a combination of the brake disk material and the clip 40.

Also within the scope of the invention presented is the clip 50 as shown in FIG. 5 as being affixed to the inner periphery of the annular disk 52 by means of rivets 54. Again, the clip has a trapezoidal key slot 56 therein; this slot being congruent with an identical tapered slot within the disk periphery. The clip 50 differs from the clip 40 of FIG. 3 in that the former has facings 58, 60 covering the disk material within the key slot. These facings, in flush contacting relation with the disk material within the slot, provide continuous force-bearing metallic surfaces for contact with the key and so completely encapsulate the disk material that oxidation probelsm are virtually eliminated.

Thus it can be seen that the objects of the invention have been achieved by the brake disk having a tapered key slot and adaptation thereto of a clip having a similar tapered key slot. While in accordance with the Patent Statutes only the best mode and preferred embodiment of the invention has been presented and described in detail, it is to be understood that the invention is not limited thereto or thereby. For an appreciation of the true scope and breadth of the invention reference should therefor be had to the following claims.

What is claimed is:

1. A brake disk made from a carbon based material having a plurality of evenly spaced slots formed around one periphery thereof, the slots, in the plane of the disk, having a bottom edge and two sides oblique thereto at an angle between 10° and 30°, and a plurality of reinforcement clips fixedly secured to said disk at said slots, the clips having slots therein congruent with the sides of the slots of the disk and aligned therewith, said clips comprising a first side member adjacent to one side of the disk, a second side member adjacent to the other side of the disk, two cap members interconnecting each of the side members on each side of the slot and extending therefrom substantially the full length of the clip, and facings interconnecting the side members and cap members within the slot of the clip to effect encapsulation of the carbon based material in the area of the clip, the clip being everywhere in flush contacting relation with such carbon based material.

* * * * *